Sept. 11, 1962 E. P. BULLARD III, ET AL 3,053,580
SLIDE BEARING
Filed March 16, 1960

INVENTORS.
EDWARD P. BULLARD III
EDWARD P. BULLARD IV
BY
ATTORNEY

United States Patent Office 3,053,580
Patented Sept. 11, 1962

---

3,053,580
SLIDE BEARING
Edward P. Bullard III and Edward P. Bullard IV, Fairfield, Conn., assignors to The Bullard Company, Bridgeport, Conn., a corporation of Connecticut
Filed Mar. 16, 1960, Ser. No. 15,434
5 Claims. (Cl. 308—3)

The present invention relates to bearings, and particularly to a new and improved plain slide bearing, and the method of making the same.

In the machine tool field, an increasing demand has been felt for hardened and ground ways along which saddles, tables and the like are reciprocated during the machining of metal. Many attempts have been made to produce hardened and ground ways for machine tools, but they universally are extremely expensive and require substantial dismantlement of the machine tool to replace them when worn or damaged.

Particularly are problems involved when such a plain bearing is required for machine tools and the like that are similar to horizontal boring mills where table and saddle travel often exceeds one hundred or more inches and in some instances extends for as much as one hundred feet.

The principal object of this invention is to provide a hardened and ground machine tool way that will be relatively inexpensive to produce, require little time to replace, and will be capable of producing all of the advantages of known hardened and ground ways.

Another object of this invention is to provide a method of making such a hardened and ground way.

Another object of the invention is to provide a continuous, uninterrupted hardened and ground plain bearing way that can extend for any desired length.

Another object of this invention is to provide a plain bearing in which a hardened and ground bearing surface is provided that is removably held in cooperating position with a flat supporting surface.

Another object of the invention is to provide such a plain bearing in which a hardened and ground bearing insert may be of such thickness that it is caused to conform to a flat supporting surface by the weight of a slidable member supported by said bearing.

Another object of the invention is to provide such a plain bearing in which a removable, relatively soft metal key is employed to hold the hardened and ground insert in cooperating position with the flat surface.

In one aspect of the invention, a supporting member which may be made of cast iron may have a flat surface machined thereon of any desired length. Flange means may be provided along one side of the machined flat surface, and it may extend above the flat surface and make an acute angle therewith. The flange means may be an integral part of the supporting member or may be strips of metal bolted or otherwise fastened to the supporting member.

In another aspect of the invention, a dovetail groove may be machined in the supporting member, parallel with the flange means. Strips of hardened and ground stock having chamfered edges corresponding to the acute angle of the flange means may be placed on the flat machined surface of the supporting member. These strips preferably should be thin enough to conform to the flat machined surface by the weight of the slidable member that is to be supported by the bearing.

It has been found that hardened and ground stock having parallel top and bottom surfaces of any desired length can be procured in the form of "band saw blade" stock. Such stock can be obtained having a desired hardness, and a thickness so that the strip will readily conform to and flat machined surface on the support by the weight of a slidable member that is supported by the bearing. The "band saw blade" stock may be plated with hard chrome to further increase the hardness of the bearing surface.

In still another aspect of the invention, the width of the hardened and ground strip may be such as to interlock on one edge with the flange means, and have its bottom edge on the opposite side intersect the one wall of a dovetail groove. A strip of relatively soft metal such as copper, zinc, lead, Babbitt, or alloys of such may be forced into the dovetail groove in a manner to lock the hardened and ground strip between the dovetail and the flange means. The soft metal key may be hammered into place, but is preferably rolled in, for example, by mounting the support on a planer and passing it beneath a roll held by the tool support of the planer.

In still another aspect of the invention, when it is desired to replace the hardened and ground strip, the end of the soft metal strip may be pried up out of the dovetail groove and by grasping the pried up end with a special tool, it can with facility be wound about the special tool and removed substantially intact from the dovetail groove.

The above, other objects and advantages of the invention will become apparent from the following specification and accompanying drawing which is merely exemplary.

Figure 1:
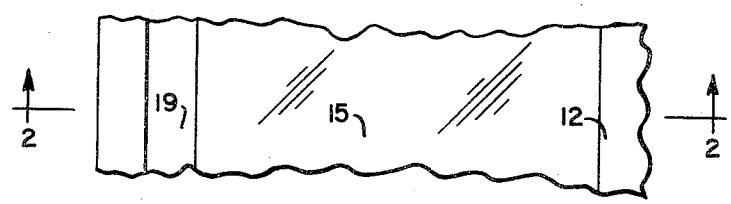
FIG. 1 is a top plan view of a fragment of a plain bearing to which the principles of the invention have been applied.
Figure 2:
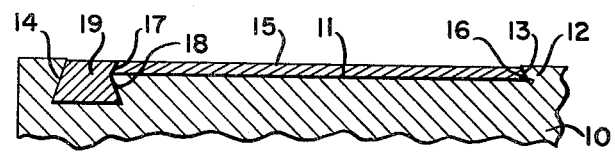
FIG. 2 is a sectional elevational view taken substantially along line 2—2 of FIG. 1.

Referring to the drawing, and particularly to FIGS. 1 and 2, the principles of the invention have been shown as applied to a plain slide bearing comprising a base 10. The base 10 may be any rigid metallic member such as cast iron and the like. A surface 11 of the base 10 may be machined so as to be flat. This may be done by a planing or milling operation. Flange means 12 may be formed along the flat surface 11 on one side thereof. The flange means 12 may include a beveled surface 13 extending above the flat surface 11 for a purpose to be described later.

A dovetail groove 14 may be machined in the base 10 and, as disclosed in FIGS. 1 and 2, may extend along the flat surface in parallel relation to the flange means 12. A relatively thin strip of "band saw" stock 15 may be provided with bevel edges 16 and 17. The bevel edge 16 may have the same bevel angle as that of the flange means 12, so that it will effectively mate therewith. The width of the stock 15 may be such that the bottom edge of the bevel 17 intersects the one wall 18 of the dovetail groove 14. The strip 15 is preferably made from "band saw" stock which can be obtained in any desired length, has parallel top and bottom surfaces, and preferably has a hardness range from between the limits of about 20 to 50 Rockwell "C." It has been found that such stock having a hardness between about 35 and 40 Rockwell "C" produces very satisfactory results.

It is preferable that the thickness of the stock 15 should be such that it will readily conform to the flat surface 11 by the weight of the slidable member supported thereby. In other words, if the thickness of the stock is too great, it becomes a structural member which tends to form a permanent "belly" which detracts from the flatness required of such bearings. On the other hand, with the thickness of stock 15 between the limits of about 0.025 to 0.075 inch, and preferably about 0.040 inch, it has been found that the stock 15 conforms substantially exactly to the flat surface 11. Since the top and bottom surfaces of the stock 15 are parallel, the ultimate result is a flat, hardened and ground bearing, regardless of any twist or curl to the stock, due to the weight of the slidable member supported by the bearing causing the stock to conform to the flat surface 11. The "band saw" stock 15 may be plated with hard chrome to provide an extremely hard bearing face. The thickness of this plate may be in the order of about 0.0005 to 0.0025 inch, and preferably in the order of about 0.0012 inch. The provision of this hard chrome plate surface makes the bearing surface much more difficult to damage than chrome-plated cast iron ways due to the backing of the tough, heat-treated "band saw" stock.

In order removably to fasten the stock 15 to the base 10, the dovetail groove 14 may be filled with a strip 19 of a relatively soft metal such as copper, zinc, lead, Babbitt or alloys thereof. While the strip 19 may be inserted by various means such as hammering and the like, it may be rolled in by a roll mounted on a planer head under which the base 10 may be passed. The strip 19, being of soft metal, conforms to the section of the dovetail groove as well as to the bevel surface 17 of the stock 15, thereby effectively locking the stock 15 between the flange means 12 and the soft metal strip 19.

Since "band saw" stock may be procured in any length, a continuous, uninterrupted plain hardened and ground bearing may be made of any desired length, up to approximately 100 feet in length. Furthermore, when it is desired to replace the stock 15 because of wear or damage, one end of the strip 19 may be pried out of the dovetail groove 14 and a key-like tool may be attached to this end. Rolling the key along the groove 14 will withdraw the strip 19 as it winds onto the key-like tool.

Figure 3:
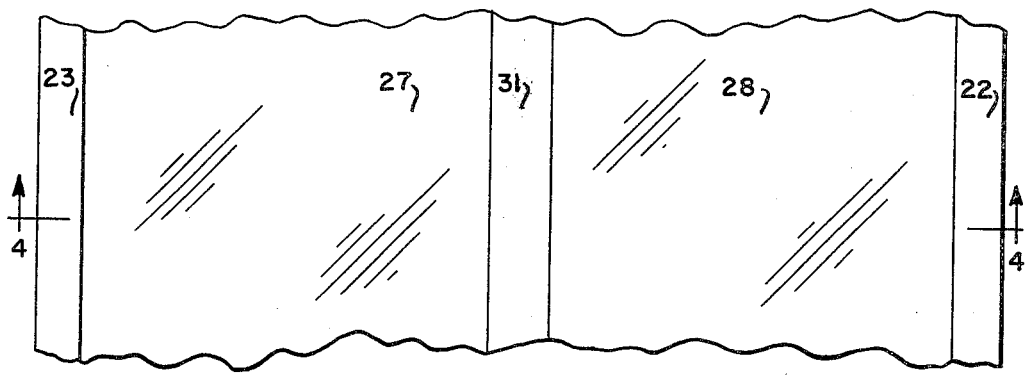
FIG. 3 is a top plan view of a fragment of a plain bearing showing a modified form of the invention.
Figure 4:
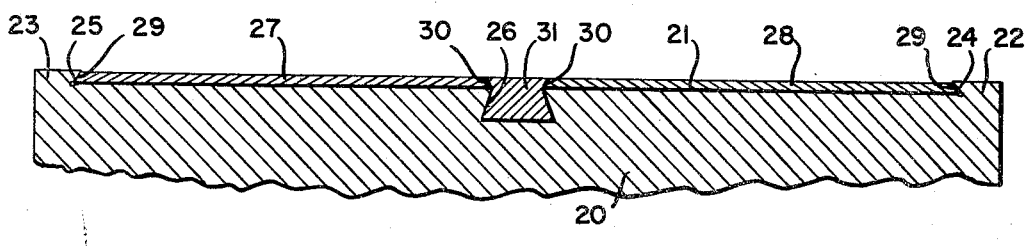
FIG. 4 is a sectional elevational view taken substantially along line 4—4 of FIG. 3.

Referring to FIGS. 3 and 4, the principles of the invention have been shown in a bearing of modified construction. The base 20 may be a cast iron support on the top of which a flat surface 21 may be formed in the manner of forming the flat surface 11. Parallel flange means 22 and 23 may be formed along the sides of the base 20, and the may include beveled surfaces 24 and 25. Although the flange means 22 and 23 are shown as part of the base 20, they may, of course, be formed by separate strips bolted or oherwise fastened to the base 20. A dovetail groove 26 may be machined in the base 20 in parallel relation to the flange means 22 and 23, and preferably centrally of the flat surface 21.

Strips 27 and 28 of "band saw" stock similar to that of stock 15 of FIG. 2 may have their opposite edges 29 and 30 beveled upwardly and inwardly such that the bottom edges of beveled edges 30 intersect the side walls of the dovetail groove 26. A strip 31 of soft metal similar to that of strip 19 may be forced into the dovetail groove 26, effectively locking the strips 27 and 28 between the flange means 23, 22 and the soft metal strip 31. The strip 31 may be removed in the same manner as strip 19 when replacement of the strips 27 and/or 28 is required.

Although the various featurse of the new and improved hardened and ground plain bearing have been shown and described in detail to fully disclose two embodiments of the invention, it will be evident that changes may be made in such details and certain features may be used without others without departing from the principles of the invention.

What is claimed is:

1. A plain bearing comprising in combination, a support having a flat surface and longitudinally extending flange means along at least one side thereof and above said flat surface, said flange means providing an acute angle with said flat surface; a longitudinally extending, dovetail groove along said flat surface, substantially parallel with said flange means and including surfaces below and above said flat surface; a strip of hardened and ground stock having parallel top and bottom surfaces located on said flat surface and extending from said flange means to said dovetail groove, said strip being thin enough to be forced into intimate contact with said flat surface by the weight of a member sliding on said bearing, said strip also having chamfered longitudinal edges corresponding to he acute angle of said flange means; and a removable relatively soft metal key within said dovetail groove for holding said strip between said key and said flange means.

2. A plain linear bearing comprising in combination, a base having a flat surface and longitudinally extending flanges along each side thereof above said flat surface, said flanges providing acute angles with said flat surface; a longitudinally extending, dovetail groove along said flat surface between said flanges; a strip of hardened and ground stock having parallel top and bottom surfaces on each side of said longitudinally extending groove, said strips being thin enough to be forced into intimate contact with said flat surface by the weight of a member sliding on said bearing, said strips also having chamfered longitudinal edges corresponding to the acute angle of said flanges; and a removable soft metal key within said dovetail groove for holding said strips between said key and said flanges.

3. A plain bearing comprising in combination, a support having a flat surface; flange means along each side of said flat surface and forming acute angles with said flat surface; strip means of hardened and ground stock having parallel top and bottom surfaces and chamfered edges adapted to mate with the acute angle of said flange means, said strip means being mounted on said flat surface, the thickness of said strip means being such that the weight of a member supported thereby causes it to conform to the flat surface supporting it; and deformed metal means contacting at least one of the chamfered edge surfaces of said strip means throughout its entire length for maintaining said strip means within the confines of said flat surface.

4. A plain bearing comprising in combination, a support having a flat surface; flange means along each side of said flat surface and forming acute angles with said flat surface; strip means of steel stock having parallel top and bottom surfaces and chamfered edges adapted to mate with the acute angle of said flange means, said strip means having a hardness within the range of about 20 to 50 Rockwell "C" and having a thickness within the range of about 0.025 to 0.075 inch; and deformed metal means contacting at least one of the chamfered edge surfaces of said strip means throughout its entire length for maintaining said strip means within the confines of said flat surface.

5. A plain bearing comprising in combination, a support having a flat surface; flange means along each side of said flat surface and forming acute angles with said flat surface; strip means of steel stock having parallel top and bottom surfaces and chamfered edges adapted to mate with the acute angle of said flange means, said strip means having a hardness within the range of about 20 to 50 Rockwell "C" and having a thickness of about 0.040 inch; and deformed metal means contacting at least one of the chamfered edge surfaces of said strip means throughout its entire length for maintaining said strip means within the confines of said flat surface.

References Cited in the file of this patent

UNITED STATES PATENTS

| | | |
|---|---|---|
| 1,280,887 | Smith | Oct. 8, 1918 |
| 2,167,609 | Dolle | July 25, 1939 |
| 2,371,399 | Mantle | Mar. 13, 1945 |
| 2,378,343 | Walter | June 12, 1945 |
| 2,630,353 | Rutz | Mar. 3, 1953 |
| 2,719,761 | Bonnaffe | Oct. 4, 1955 |
| 2,821,010 | Vasconi et al. | Jan. 28, 1958 |
| 2,959,452 | Wetzel | Nov. 8, 1960 |